COUPLING UNIT FOR TELECOMMUNICATIONS SYSTEM

Filed June 20, 1966

INVENTOR
PHILIP J MCFARLAND

COUPLING UNIT FOR TELECOMMUNICATIONS SYSTEM

INVENTOR
PHILIP J MCFARLAND

United States Patent Office 3,452,160
Patented June 24, 1969

3,452,160
COUPLING UNIT FOR TELECOMMUNICATIONS SYSTEM

Philip J. McFarland, Lynnfield, Mass., assignor to Dasa Corporation, Andover, Mass., a corporation of Massachusetts Filed June 20, 1966, Ser. No. 558,637
Int. Cl. H04n *1/26*
U.S. Cl. 179—90 3 Claims

ABSTRACT OF THE DISCLOSURE

A coupling unit between the subscriber set, which consists of a repertory dialer and a telephone set, and the entral office, designed so as to test the pulse train emitted rom the repertory dialer for timing error. If the coupling nit detects timing error, the repertory dialer is disconected from the line and the telephone set is coupled o the line. The coupling device functions to couple the repertory dialer to the line upon initiating the repertory dialer's operation.

Figure 1:
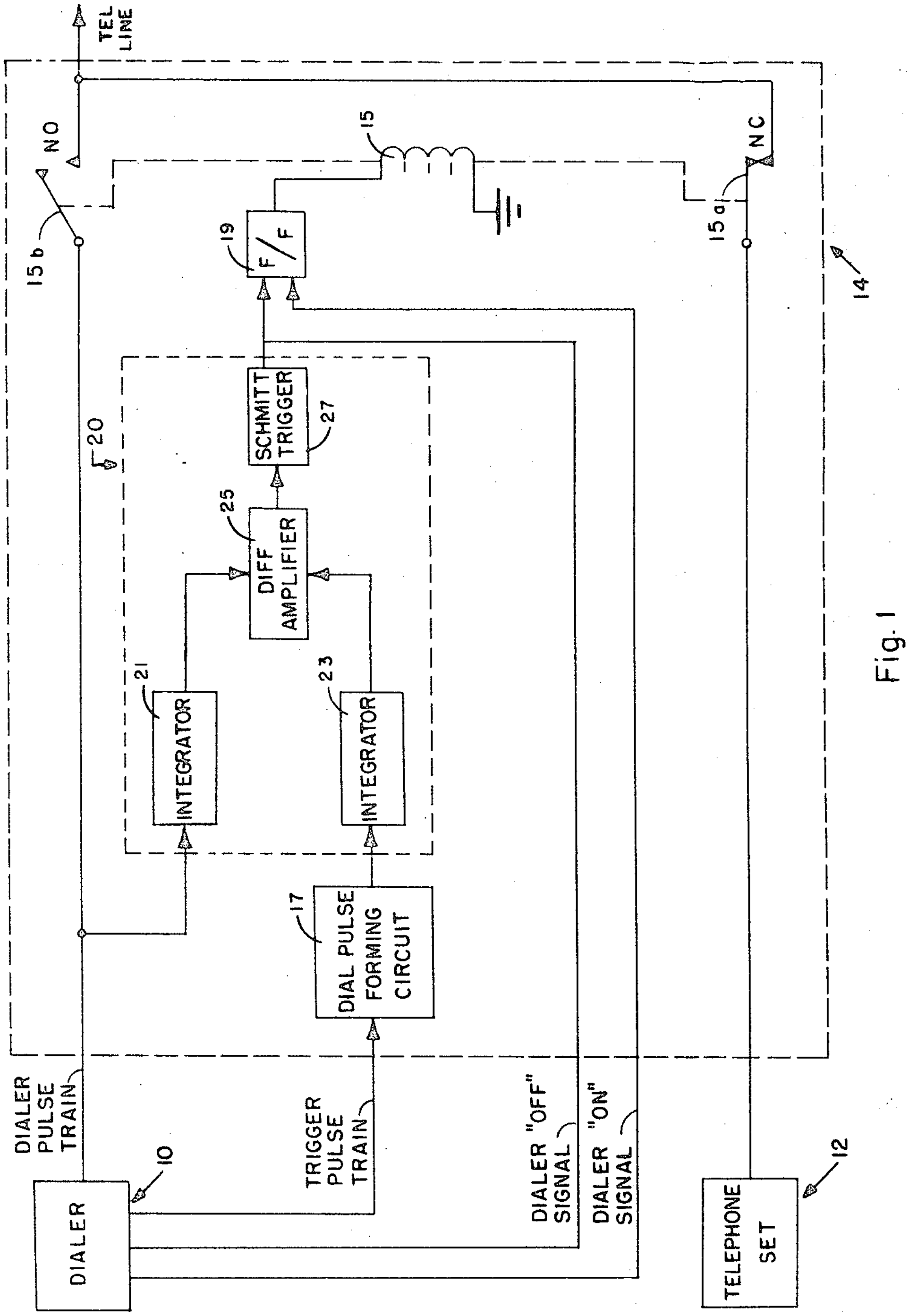

This invention pertains generally to apparatus for telecommunications systems and particularly to apparatus for ensuring the introduction of properly formed call signals to a telephone or a telegraphic system.

In the field of telephony in particular, it is of the utmost importance that properly formed call signals, for example, trains of dial pulses, be transmitted to central stations. The underlying reason for having properly formed call signals becomes self-evident when one considers the telephone systems of the United States (interconnected as they are so that call signals originating at any station in the country may actuate the switching gear in any one of thousands of central offices) as a complex computer system. It is manifest that call signals generated at any station must be properly formed so that such signals, after transmission through the telephone system equipment, may actuate any central station in a desired way so that the quality of telephone service may be maintained at an acceptable level.

In the past, the various telephone companies have, in the main, attempted to eliminate improper station apparatus by applying the rule against "foreign attachments." That is, the telephone companies, in accordance with regulations promulgated by proper governmental agencies, have discouraged the use of foreign attachments by maintaining ownership and control of all station apparatus so that the quality, dependability and compatibility of any such apparatus would, presumably, be kept at an acceptable level. Obviously, however, such a method of operation, differing as it does from the method of operation of all other public utilities, has not solved the problem but rather has engendered a great deal of animosity in the public mind.

Various telephone companies have recognized that the now traditional way of controlling foreign attachments simply cannot be justified in all cases. For example, various telephone emergency alarm systems—for fire, police or other emergencies of a like nature—have been developed to meet changing needs. Such alarms are not owned or controlled by the telephone companies, but must, nevertheless, not degrade telephone service. In order that the uncontrolled dial pulses from such alarms may be used in telephone systems it has, until now, been customary to provide a so-called "pulse purifier." Such a unit simply accepts malformed dial pulses and converts such pulses to acceptable form. Obviously, however, such a unit cannot correct basic timing errors. Consequently, misoperation of central station equipment may still occur when "pulse purifiers" are used.

Another problem concerning dialing signals has become evident in recent years with the advent of various kinds of auxiliary equipment, as automatic dialers, which are used in combination with conventional telephone station apparatus. That is, it has become evident that such auxiliary equipment must be so designed and connected so that it "fails safe" if failure of any nature of any auxiliary equipment is not to interfere with the normal operation of the telephone set. Although this problem was recognized at least a decade ago (Johanson 2,953,547), no really practical solution to the problem has been devised since it is not sufficient merely to have a manual or an automatic switching arrangement, as taught in the cited patent, to connect either a telephone set or associated auxiliary equipment to a telephone line.

Therefore, it is a primary object of this invention to provide apparatus for use in telephone systems which will pass only dial signals having characteristics compatible with the characteristics of such a telecommunications system.

Another object of this invention is to provide apparatus for use in telephone systems to connect a conventional telephone set in tandem with any desired auxiliary equipment so that, in the event such auxiliary equipment fails to operate properly, the telephone set may always be used.

Another object of this invention is to provide apparatus meeting the foregoing objects using only conventional elements which may be assembled into complete units at a relatively low cost.

These and other objects of this invention are attained generally by installing an improved coupling unit between a conventional telephone set, a unit of auxiliary equipment (as an automatic dialer) and a telephone system. The contemplated coupling unit comprises a relay having contacts which, when the relay is in its normal state (say deenergized), connects the telephone set to the telephone line and disconnects the auxiliary equipment therefrom. The state of the relay is controlled so that it may be in its off-normal state (say energized) only when the output signal from the auxiliary equipment matches, within predetermined limits, the output signal from a standard circuit in the coupler. Thus, auxiliary equipment which does not produce proper dial signals cannot actuate any central office and failure of any such equipment cannot interfere with operation of the telephone handset.

For a more complete understanding of the invention, reference is now made to the drawings and the description thereof which together illustrate embodiments of the invention wherein a telephone set and an automatic dialer are coupled to a telephone line in a manner to attain the objects of the invention. In the drawings, FIG. 1 is a block diagram of a preferred embodiment of the invention, illustrating how the desired switching between a telephone set and an automatic dialer may be effected using a relay; and FIG. 2 is a block diagram of an alternative embodiment of the invention illustrating how solid state switching may be utilized to attain the desired effects.

Before the detailed discussion of the drawings is begun, it should be noted that the illustrated coupling unit is one designed to operate with a conventional telephone set and an electronic dialer made and sold by the assignee of this application under the registered trademark "Magicall." In such a dialer, magnetically recorded signals indicative of a desired telephone number are first read by a transducer and the resulting pulses are then fed into a dial pulse forming circuit. The latter circuit, shown in detail in the co-pending application of Moseley et al., Ser. No. 420,849 now Patent No. 3,365,549 (which application is assigned to the assignee of this application), operates to reconstitute the pulses out of the transducer into telephone dial pulses of the proper shape. Further, the Moseley et al. circuit is so arranged that, even though there may be some variation in the time between successive pulses out of the transducer, the "make-break" ratio of the finally reconstituted dial pulse signals tends to remain constant.

Figure 2:
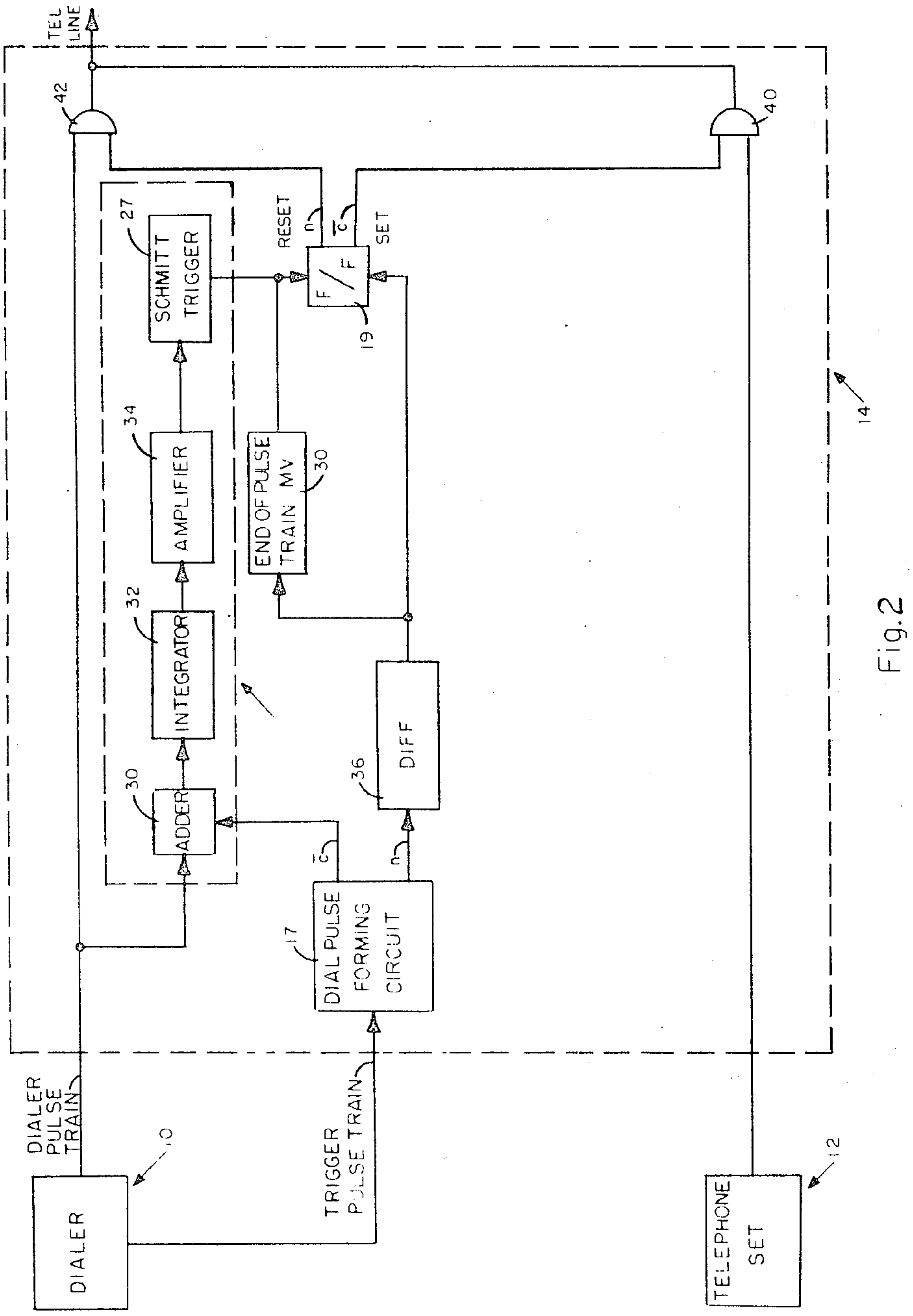

With the foregoing in mind, reference is now made to FIG. 1 in which a dialer 10 and telephone set 12 are shown in combination with a coupling unit 14. The latter unit comprises a relay 15 which controls a pair of contactors 15*a*, 15*b*, respectively "normally closed" and "normally open" (meaning the state of each one of such contactors when relay 15 is in its normally deenergized condition). With the contactors 15*a*, 15*b* in their normal positions the telephone set 12 is connected to the line marked "telephone line" while the dialer 10 is disconnected from such line. Relay 15 may be forced into its off-normal position, i.e. energized state, only when the following conditions obtain: (a) the dialer 10 is in its operative state; and (b) the dialer pulse train out of the dialer 10 is substantially the same as the pulse train produced by a standard 17 (herein also sometimes designated as a dial pulse forming circuit).

To put it another way, relay 15 is energized as long as a normally reset bistable multivibrator, or flip-flop, 19 is set. Setting of the latter, in the illustrated embodiment, is accomplished when the "call" button (not shown) of the dialer 10 is actuated to energize its transducer drive motor (not shown). The flip-flop 19 remains in its set state until either one of two events occur: (a) the dialer 10 completes its operation, thereby producing a "dialer off signal" (again as shown in the cited Moseley et al. application); or (b) a comparator 20 in the coupling unit 14 produces a signal indicating mismatch between the dialer pulse train and the pulse train out of the standard 17. The comparator 20 here illustrated comprises an identical pair of integrators 21, 23, a differential amplifier 25 and a conventional Schmitt trigger circuit 27, connected as shown. A moment's thought will make it clear that the comparator 20 will reset the flip-flop 19 whenever a transition, whether positive-going or negative-going, in the dialer pulse train occurs at a different time from a corresponding transition in the pulse train out of the standard 17. A moment's thought will also make it clear that the comparator 20 may be easily adjusted to permit a wide, or a narrow, tolerance. For example, the time constant of each of the integrators 21, 23, the gain of the differential amplifier 25 and the triggering level of the Schmitt trigger 27 may be adjusted to permit a wide, or a narrow, tolerance. For example, the time constant of each of the integrators 21, 23, the gain of the differential amplifier 25 and the triggering level of the Schmitt trigger 27 may each be adjusted as desired so that a greater, or lesser, difference in the time of occurance of each transition of the pulses in the dialer pulse train, as compared to the corresponding transition in each pulse in the pulse train out of the standard 17, will ultimately cause the flip-flop 19 to be reset. Whenever the flip-flop 19 is reset, relay 15 returns to its normal state (therby causing the contactors 15*a*, 15*b* to return to their normal states) so that the telephone set 12 may again be used until the call button of the dialer 10 is again actuated.

It will be obvious to one skilled in the art that the various elements in the coupling unit 14 may be changed in many respects without departing from the concept of providing a standard, means for comparing the dial pulses out of such standard with the dial pulses out of auxiliary equipment (as an automatic dialer) and switching means to connect the auxiliary equipment into a telephone system only when such equipment is operating properly. Thus, referring now to FIG. 2, the embodiment of the invention there illustrated demonstrates a way in which the coupling unit may be so changed. In FIG. 2, elements which are indentical to elements shown in FIG. 1 bear the same numerical designation and those which have the same function are numbered with superscripts. Also, in FIG. 2, where necessary for clarity, the normal and complementary output terminals of multivibrators are indicated, respectively, by the symbols "*n*" and "$\bar{c}$."

The complementary output of the standard 17 and the output of the dialer 10 are fed into a conventional adder 30 with the result that: (a) if the transitions of the pulses out of the dialer 10 and the standard 17 coincide in time and are of the same amplitude, there is no change in output of the adder 30; (b) if the transitions do not coincide, the output of the adder will be a positive or a negative pulse, depending on which transition first occurs. The output of the adder is fed, successively, through an integrator 32 and an amplifier 34 to actuate the Schmitt trigger 27 whenever the signal out of the integrator 32 reaches a predetermined level (when indicated that the pulses out of the dialer 10 are out of synchronism by a predetermined amount from the pulses out of the standard 17). The Schmitt trigger then resets the flip-flop 19 as described hereinbefore.

The pulse trigger passed to the standard 17 from the dialer 10 is assumed to cause the normal output of the former to go to its high or "normal" state. This output signal is formed into a pulse on passing through a differentiator 17 to set flip-flop 19 and also to cause the "end of pulse train" multivibrator to be forced into its off-normal condition.

When flip-flop 19 is set, AND gate 40 (theretofore enabled) is disabled so that the telephone set 12 is disconnected from the telephone line and AND gate 42 (theretofore disabled) is enabled so that the dialer 10 is again connected to the telephone line.

The "end of pulse train" multivibrator 38 preferably is of the same type as the multivibrator described in the Moseley et al. application for controlling the transducer drive motor. That is, the "end of pulse train" multivibrator is a unistable multivibrator having a period longer than the expected time between successive pulses out of the dialer 10 and adapted to be kept in its off-normal condition as long as it receives pulses. Thus, at the end of each pulse train making up a digit to be dialed, the "end of pulse train" multivibrator 38 provides a reset signal to the flip-flop 19 to force that element back to its initial condition when all the pulses in any train from the dialer 10 meet the limits determined by the standard 17 and the comparator 20.

Although both embodiments illustrated herein utilize one or two integrators so that a control pulse is generated only when a pulse from the dialer does not match, within predetermined limits, the corresponding pulse from the standard, it is not essential that such an approach be taken. That is, the comparator circuit could just as well be arranged so as to produce a train of control pulses as long as a selected characteristic of the dial pulse signal out of the dialer substantially matches a corresponding characteristic of the output signal of the standard. For example, if pulse width were to be taken as the criterion, the pulse trains out of the dialer and the standard could be differentiated and added to provide a trigger pulse of sufficient amplitude to trigger a Schmitt trigger generator only when coincidence of such differentiated signals occurs. The Schmitt trigger generator then would be connected to a multivibrator of the type shown in the cited Moseley application to control the transducer drive motor therein, i.e. a unistable multivibrator which remains in its off-normal state as long as a continuous train of pulses are fed into it. Such a multivibrator would be substituted for the bistable multivibrator shown in the drawings to control the relay, thereby causing the latter element to be energized only when the pulse width of the dialer's output signal substantially matches the pulse width of the standard's output signal.

In view of the alternative embodiments described as well as other modifications which will be apparent to those having skill in the art, it is felt that this invention should not be restricted to its illustrated embodiments but rather should be limited only by the spirit and scope of the appended claims.

What is claimed is:

1. In a telecommunication system, a coupling unit in circuit between a central office and a station, such coupling unit being adapted normally to couple selected equipment at the station to the central office and to decouple auxiliary equipment at the station from the central office and to reverse such coupling when the auxiliary equipment is actuated and is producing call signals having characteristics required to ensure proper operation of the central station, such coupling unit comprising:

(a) means, responsive to generation of a call signal by the auxiliary equipment, for producing a similar call signal, the latter signal having at least one of the characteristics of a call signal required to ensure proper operation of the central station;

(b) means for comparing the call signal generated by the auxiliary equipment with the call signal produced by the first named means to generate a control signal when at least one of the characteristics of the latter call signal differs substantially from a corresponding characteristic of the former call signal; and (c) switching means, responsive first to actuation of the auxiliary equipment to couple the auxiliary equipment to, and decouple the selected equipment from, the central office and, then, responsive to the occurrence of a control signal to reverse the coupling of the auxiliary equipment and the selected equipment.

2. In a telecommunications system wherein the selected equipment is a telephone set and the auxiliary equipment is an automatic dialer, a coupling unit as in claim 1, wherein the switching means includes:

(a) a relay having a normally closed contactor and a normally open contactor, such contactors being disposed, respectively, in series between the telephone set, the automatic dialer and the central office;

(b) a bistable multivibrator to control current through the relay, such bistable multivibrator being normally reset so that the relay is normally deenergized;

(c) means, responsive to actuation of the automatic dialer, to set the bistable multivibrator thereby to energize the relay and finally to cause the normally closed contactor to open and the normally open contactor to close;

(d) means, responsive to the occurrence of a control signal, to reset the bistable multivibrator, to restore the normally open and closed contactors to their normal positions; and (e) means, responsive to de-actuation of the automatic dialer, to reset the bistable multivibrator, ultimately to restore the normally open and closed contactors to their normal positions in the event no control signal is generated.

3. In a telecommunications system wherein the selected equipment is a telephone set and the auxiliary equipment is an automatic dialer, a coupling unit as in claim 1 wherein the switching means includes:

(a) a first AND gate connected in circuit between the telephone set and the central office;

(b) a second AND gate connected in circuit between the automatic dialer and the central office;

(c) a bistable multivibrator normally conditioned to enable the first AND gate and to disable the second AND gate;

(d) means, responsive to actuation of the automatic dialer for changing the condition of the bistable multivibrator to disable the first AND gate and to enable the second AND gate;

(e) means, first responsive to the occurrence of a control signal, and then, responsive to deactuation of the automatic dialer in the event no control signal is generated, for changing the condition of the bistable multivibrator back to its original condition.

References Cited

UNITED STATES PATENTS

| | | | |
|---|---|---|---|
| 2,684,409 | 7/1954 | Kessler | 179—175.2 |
| 2,717,278 | 9/1955 | Blackhall | 179—16.4 |
| 2,953,647 | 9/1960 | Johanson | 179—90 |
| 3,243,526 | 3/1966 | La Barge et al. | 179—175.2 |

KATHLEEN H. CLAFFY, *Primary Examiner.*

ALBIN H. GESS, *Assistant Examiner.*

U.S. Cl. X.R.

170—16; 179—175.2